United States Patent
Oka (10) Patent No.: US 9,568,812 B2
(45) Date of Patent: Feb. 14, 2017

(54) IMAGE PROJECTION APPARATUS AND CONTROL METHOD THEREOF

(71) Applicant: CANON KABUSHIKI KAISHA, Tokyo (JP)

(72) Inventor: Nobuhiro Oka, Yokohama (JP)

(73) Assignee: Canon Kabushiki Kaisha, Tokyo (JP)

(*) Notice: Subject to any disclaimer, the term of this patent is extended or adjusted under 35 U.S.C. 154(b) by 306 days.

(21) Appl. No.: 13/948,193

(22) Filed: Jul. 23, 2013

(65) Prior Publication Data

US 2014/0049756 A1 Feb. 20, 2014

(30) Foreign Application Priority Data

Aug. 14, 2012 (JP) ................. 2012-179886

(51) Int. Cl.
| | |
|---|---|
| G03B 21/14 | (2006.01) |
| H04N 3/23 | (2006.01) |
| H04N 9/31 | (2006.01) |
| G03B 21/00 | (2006.01) |
| H04N 5/74 | (2006.01) |
| G06T 5/00 | (2006.01) |

(52) U.S. Cl.
CPC ............. *G03B 21/147* (2013.01); *G03B 21/00* (2013.01); *G03B 21/14* (2013.01); *H04N 3/23* (2013.01); *H04N 5/7416* (2013.01); *H04N 9/317* (2013.01); *H04N 9/3185* (2013.01); *G06T 5/006* (2013.01)

(58) Field of Classification Search
CPC ....... G03B 21/14; G03B 21/00; G03B 21/147; H04N 3/23; H04N 9/317; H04N 9/3185; H04N 5/7416; G06T 5/006
See application file for complete search history.

(56) References Cited

U.S. PATENT DOCUMENTS

| | | | |
|---|---|---|---|
| 2003/0223049 A1* | 12/2003 | Ohara ........................... | 353/101 |
| 2008/0284987 A1 | 11/2008 | Yonezawa | |
| 2009/0027629 A1* | 1/2009 | Yonezawa ....................... | 353/70 |
| 2009/0278999 A1* | 11/2009 | Ofune et al. .................. | 348/745 |
| 2010/0165168 A1* | 7/2010 | Takahashi .................. | 348/333.1 |
| 2011/0025982 A1* | 2/2011 | Takahashi ....................... | 353/15 |
| 2012/0105813 A1* | 5/2012 | Todoroki ............. | H04N 9/3194 353/69 |

FOREIGN PATENT DOCUMENTS

| | | |
|---|---|---|
| JP | 2006121240 A | 5/2006 |
| JP | 2010-048849 A | 3/2010 |
| JP | 4578341 B2 | 11/2010 |

* cited by examiner

*Primary Examiner* — Sultan Chowdhury
*Assistant Examiner* — Magda Cruz
(74) *Attorney, Agent, or Firm* — Fitzpatrick, Cella, Harper & Scinto

(57) ABSTRACT

An image projection apparatus comprises a projection unit configured to project an image onto a projection plane, a correction unit configured to correct a range of the image projected by the projection unit, a deformation unit configured to deform the projected range of the image according to a designated correction point, and a control unit configured to optically change the projected range of the image projected by the projection unit according to a designation of an outside of a predetermined range as the correction point.

18 Claims, 10 Drawing Sheets

IMAGE PROJECTION APPARATUS AND CONTROL METHOD THEREOF

BACKGROUND OF THE INVENTION

Field of the Invention

The present invention relates to an image projection apparatus and control method thereof.

Description of the Related Art

Conventionally, as a distortion correction method of an image projection apparatus, a technique for attaining distortion correction by deforming a projected image according to move instructions of points of four corners from the user is known. However, with this technique, since the points of the four corners cannot be moved outside the projected image, the user has to set the image projection apparatus before distortion correction so that the projected image includes a screen.

For example, Japanese Patent No. 4578341 and Japanese Patent Laid-Open No. 2006-121240 disclose the following technique. Initially, before distortion correction, a shooting is performed in a projecting direction by an image capturing unit to recognize a positional relationship between a projected region and projected image. Next, a zoom condition that the outer circumference of the projected image is not located within a screen region and the projected image becomes as small as possible is calculated, a zoom lens is driven to satisfy that condition, and the image is then deformed to attain distortion correction of the projected image.

However, the technique described in Japanese Patent No. 4578341 and Japanese Patent Laid-Open No. 2006-121240 requires the image capturing unit to recognize the projected region before distortion correction, resulting in an increase in cost. Also, when a projected region cannot be specified from a captured image (for example, when an image is projected onto a plain wall), distortion correction cannot be appropriately attained.

SUMMARY OF THE INVENTION

The present invention has been made in consideration of the aforementioned problems, and realizes an image projection apparatus and control method thereof, which can attain distortion correction of a projected image to an appropriate size and shape without using any imaging unit and independently of a positional relationship between the projected image and projected region before distortion correction.

In order to solve the aforementioned problems, the present invention provides an image projection apparatus comprising: a projection unit configured to project an image onto a projection plane; a correction unit configured to correct a range of the image projected by the projection unit; a deformation unit configured to deform the projected range of the image according to a designated correction point; and a control unit configured to optically change the projected range of the image projected by the projection unit according to a designation of an outside of a predetermined range as the correction point.

In order to solve the aforementioned problems, the present invention provides a control method of an image projection apparatus having a projection unit configured to project an image onto a projection plane, a correction unit configured to: correct a range of the image projected by the projection unit, and a deformation unit configured to deform the projected range of the image according to a designated correction point, the method comprising optically changing the projected range of the image projected by the projection unit according to a designation of an outside of a predetermined range as the correction point.

Further features of the present invention will become apparent from the following description of exemplary embodiments (with reference to the attached drawings).

DESCRIPTION OF THE EMBODIMENTS

Embodiments of the present invention will be described in detail below. The following embodiments are merely examples for practicing the present invention. The embodiments should be properly modified or changed depending on various conditions and the structure of an apparatus to which the present invention is applied. The present invention should not be limited to the following embodiments. Also, parts of the embodiments to be described later may be properly combined.

[First Embodiment]

The following is a description of an embodiment in which an image projection apparatus according to the present invention is applied to, for example, a liquid-crystal projector that projects image.

<Apparatus Configuration>

Figure 1:
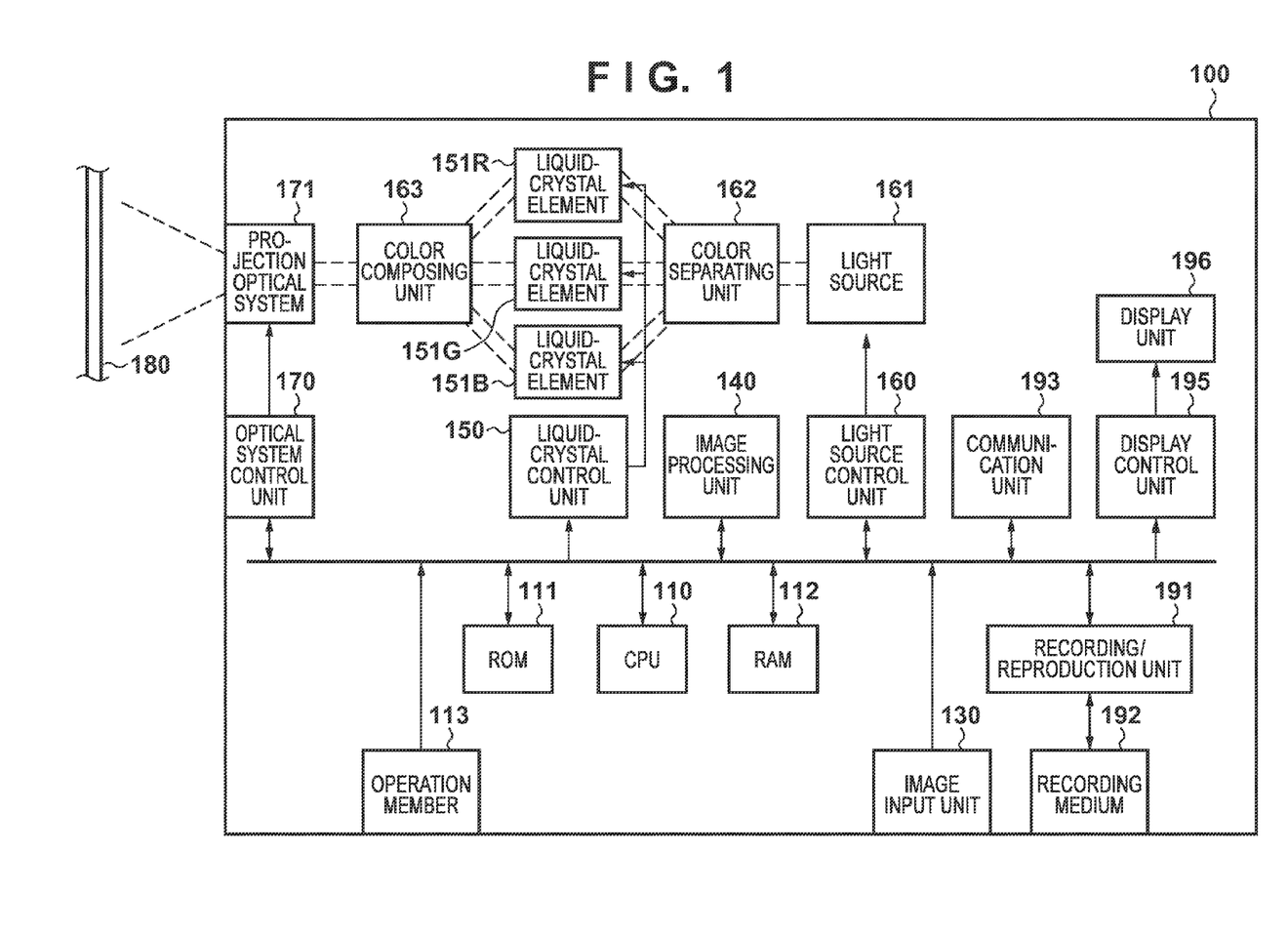
FIG. 1 is a block diagram showing a configuration of an image projection apparatus according to an embodiment of the present invention.

A configuration and functionality of the image projection apparatus of the embodiments of the present invention will now be described with reference to FIG. 1.

A liquid-crystal projector (to be simply referred to as a projector hereinafter) of this embodiment controls light transmittances of liquid-crystal elements in accordance with an image to be displayed to project light which comes from a light source and is transmitted through the liquid-crystal elements onto a screen, thereby projecting the image to the user. FIG. 1 shows the overall arrangement of a projector 100 of this embodiment.

The projector 100 of this embodiment includes a CPU 110, ROM 111, RAM 112, operation member 113, image input unit 130, and image processing unit 140. Also, the projector 100 includes a liquid-crystal control unit 150, liquid-crystal elements 151R, 151G, and 151B, light source control unit 160, light source 161, color separating unit 162, color composing unit 163, optical system control unit 170, and projection optical system 171. Furthermore, the projector 100 may also include a recording/reproduction unit 191, recording medium 192, communication unit 193, imaging unit 194, display control unit 195, and display unit 196.

The CPU 110 controls respective operation blocks of the projector 100. The ROM 111 stores a control program which describes the processing sequence of the CPU 110. The RAM 112 temporarily stores the control program and data as a work memory. The CPU 110 temporarily stores still image data or moving image data reproduced from the recording medium 192 by the recording/reproduction unit 191, and can reproduce the image or video using the program stored in the ROM 111. Also, the CPU 110 temporarily stores still image data or moving image data received by the communication unit 193, and can reproduce the image or video using the program stored in the ROM 111. Furthermore, the CPU 110 temporarily stores an image or video obtained by the imaging unit 194 on the RAM 112, converts the stored image or video into still image data or moving image data using the program stored in the ROM 111, and can record the converted data in the recording medium 192.

The operation member 113 includes, for example, switches, dials, a touch panel arranged on the display unit 196, and the like, accepts a user instruction, and transmits an instruction signal to the CPU 110. Also, the operation member 113 may transmit a predetermined instruction signal to the CPU 110 based on a signal received by, for example, a signal receiving unit (for example, an infrared receiving unit) which receives a signal from a remote controller (not shown). The CPU 110 receives a control signal input from the operation member 113 or communication unit 193, and controls the respective operation blocks of the projector 100.

The image input unit 130 receives an image signal or video signal from an external apparatus. The image input unit 130 includes, for example, a composite terminal, S video terminal, D terminal, component terminal, analog RGB terminal, DVI-I terminal, DVI-D terminal, HDMI® terminal, and the like. When the image input unit 130 receives an analog image signal or video signal, it converts the received analog signal into a digital signal, and transmits the digital signal to the image processing unit 140. Note that the external apparatus is not particularly limited, and may include a personal computer, camera, mobile phone, smartphone, hard disk recorder, game machine, and the like as long as they can output an image signal or video signal.

The image processing unit 140 includes, for example, an image processing microprocessor, applies change processing of the number of frames, the number of pixels, an image shape, and the like to an image signal or video signal received from the image input unit 130, and transmits the processed signal to the liquid-crystal control unit 150. The image processing unit 140 need not always include a dedicated microprocessor. For example, the CPU 110 may execute the same processing as the image processing unit 140 using a program stored in the ROM 111. The image processing unit 140 can execute functions such as frame decimation processing, frame interpolation processing, resolution conversion processing, and distortion correction processing (keystone correction processing). Also, the image processing unit 140 can also apply the aforementioned change processing to an image or video reproduced by the CPU 110 in addition to the signal received from the image input unit 130. The detailed behavior related to the distortion correction processing by this image processing unit 140 will be described later.

The liquid-crystal control unit 150 includes, for example, a control microprocessor, and controls voltages to be applied to liquid crystals of pixels of the liquid-crystal elements 151R, 151G, and 151B of liquid-crystal panels based on an image signal or video signal processed by the image processing unit 140, thereby adjusting the transmittances of the liquid-crystal elements 151R, 151G, and 151B. Note that the liquid-crystal control unit 150 need not always be a dedicated microprocessor. For example, the CPU 110 may execute the same processing as the liquid-crystal control unit 150 using a program stored in the ROM 111. For example, when a video signal is input to the image processing unit 140, the liquid-crystal control unit 150 controls the liquid-crystal elements 151R, 151G, and 151B to have transmittances corresponding to an image every time it receives an image for one frame from the image processing unit 140. The liquid-crystal element 151R corresponds to red, and adjusts a transmittance of red light of light rays which are output from the light source 161 and are separated into red (R), green (G), and blue (B) light rays by the color separating unit 162. The liquid-crystal element 151G corresponds to green, and adjusts a transmittance of green light of light rays which are output from the light source 161 and are separated into red (R), green (G), and blue (B) light rays by the color separating unit 162. The liquid-crystal element 151B corresponds to blue, and adjusts a transmittance of blue light of light rays which are output from the light source 161 and are separated into red (R), green (G), and blue (B) light rays by the color separating unit 162.

The light source control unit 160 includes, for example, a control microprocessor, which executes ON/OFF control and light amount control of the light source 161. Note that the light source control unit 160 need not always be a dedicated microprocessor. For example, the CPU 110 may execute the same processing as the light source control unit 160 using a program stored in the ROM 111. The light source 161 includes, for example, a halogen lamp, xenon lamp, or high-pressure mercury lamp, and outputs light required to project an image onto a screen 180. The color separating unit 162 includes, for example, a dichroic mirror and prism, and separates light output from the light source 161 into red (R), green (G), and blue (B) light components. Note that when LEDs or the like corresponding to respective colors are used as the light source 161, the color separating unit 162 is not necessary. The color composing unit 163 includes, for example, a dichroic mirror and prism, and composes red (R), green (G), and blue (B) light rays transmitted through the liquid-crystal elements 151R, 151G, and 151B. Then, light, the red (R), green (G), and blue (B) light components of which are composed by the color composing unit 163, is sent to the projection optical system 171. At this time, the liquid-crystal elements 151R, 151G, and 151B are controlled by the liquid-crystal control unit 150 so as to have transmittances corresponding to an image input from the image processing unit 140. For this reason, when the light composed by the color composing unit 163 is projected onto the screen via the projection optical system 171, an image corresponding to that input by the image processing unit 140 is displayed on the screen.

The optical system control unit 170 includes, for example, a control microprocessor, and controls the projection optical system 171. Note that the optical system control unit 170 need not always be a dedicated microprocessor. For example, the CPU 110 may execute the same processing as the optical system control unit 170 using a program stored in the ROM 111. Also, the projection optical system 171 projects composed light output from the color composing unit 163 onto the screen. The projection optical system 171 includes a plurality of lenses and an actuator for driving the lenses, and can attain an enlargement/reduction, shift, focus adjustment, and the like of a projected image by driving the lenses by the actuator.

The recording/reproduction unit 191 reproduces still image data or moving image data from the recording medium 192. Also, the recording/reproduction unit 191 receives still image data or moving image data obtained by the imaging unit 194 from the CPU 110, and records the received data in the recording medium 192. Also, the recording/reproduction unit 191 may record still image data or moving image data received from the communication unit 193 to the recording medium 192. The recording/reproduction unit 191 includes, for example, an interface required to electrically connect the recording medium 192, and a microprocessor required to communicate with the recording medium 192. Note that the recording/reproduction unit 191 need not always include a dedicated microprocessor. For example, the CPU 110 may execute the same processing as the recording/reproduction unit 191 using a program stored in the ROM 111. The recording medium 192 can record still image data, moving image data, control data required for the projector of this embodiment, and the like. The recording medium 192 can include recording media of every systems such as a magnetic disk, optical disk, and semiconductor memory, and may be either a detachable recording medium or built-in type recording medium.

The communication unit 193 is used to receive a control signal, still image data, moving image data, and the like from an external apparatus, and may include, for example, a wireless LAN, wired LAN, USB, Bluetooth®, or the like, since it is not particularly limited to a specific communication system. On the other hand, when the terminal of the image input unit 130 is, for example, an HDMI® terminal, the communication unit 193 may make CEC communications via that terminal. Note that the external apparatus is not particularly limited, and may include a personal computer, camera, mobile phone, smartphone, hard disk recorder, game machine, remote controller, and the like, as long as they can communicate with the projector 100.

The display control unit 195 includes a display control microprocessor and the like, and controls to display an operation screen and images such as switch icons, which are required to operate the projector 100 on the display unit 196 included in the projector 100. Note that the display control unit 195 need not always be a dedicated microprocessor. For example, the CPU 110 may execute the same processing as the display control unit 195 using a program stored in the ROM 111. The display unit 196 displays the operation screen and switch icons required to operate the projector 100. The display unit 196 is not particularly limited as long as it can display an image. For example, a liquid-crystal display, CRT display, organic EL display, or LED display may be used. Alternatively, the display unit 196 may control LEDs corresponding to respective buttons to emit light so as to allow the user to recognize a specific button.

Note that the image processing unit 140, liquid-crystal control unit 150, light source control unit 160, optical system control unit 170, recording/reproduction unit 191, and display control unit 195 may be one or a plurality of microprocessors, which can execute the same processing as these operation blocks. Alternatively, for example, the CPU 110 may execute the same processing as the respective blocks using programs stored in the ROM 111.

<Basic Operation>

The basic operation of the projector 100 of this embodiment will be described below with reference to FIGS. 1 and 2.

Figure 2:
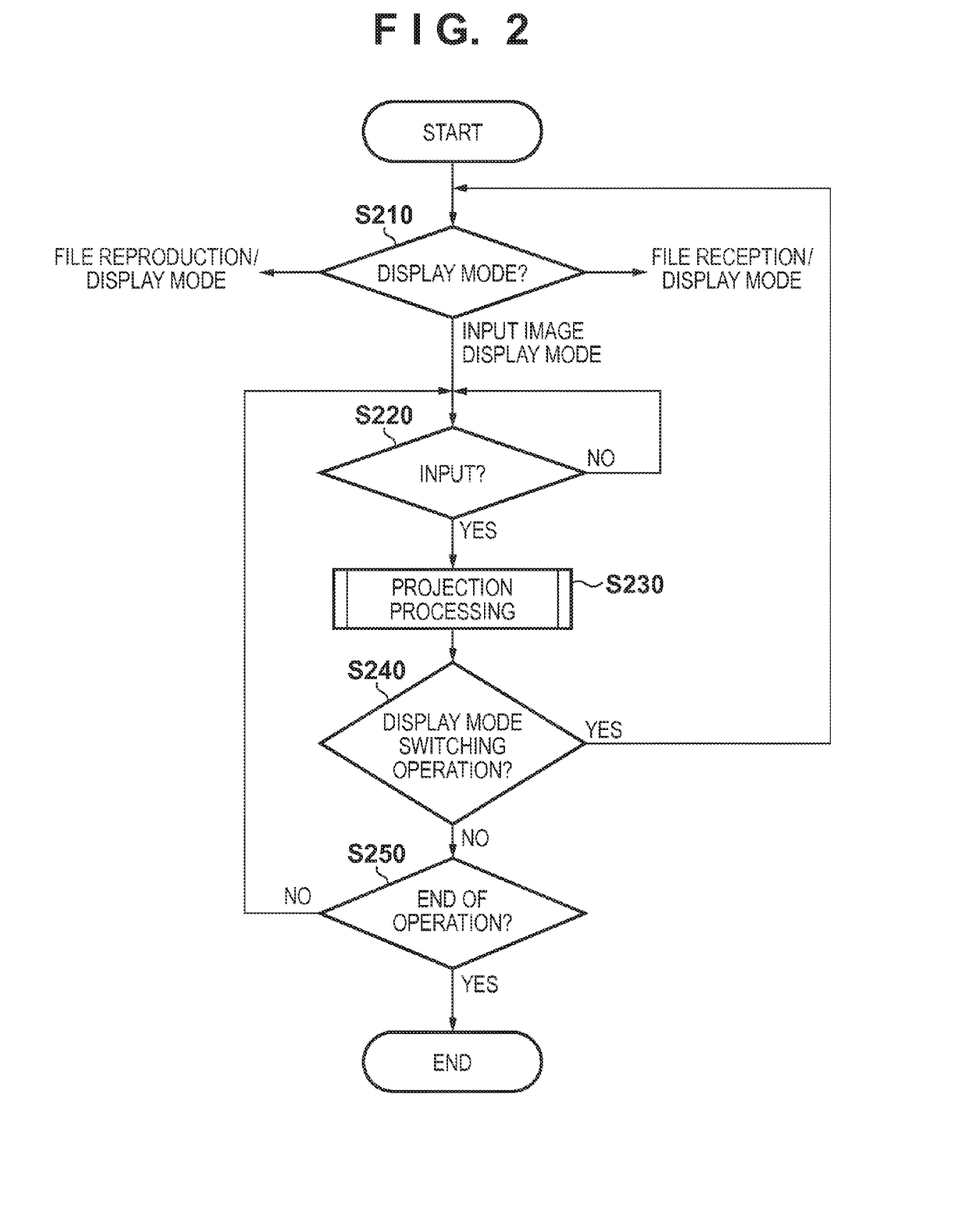
FIG. 2 is a flowchart showing a basic operation of a projector according to the embodiment.

FIG. 2 is a flowchart showing the basic operation of the projector 100 of this embodiment. The operation shown in FIG. 2 is implemented when the CPU 110 expands a program stored in the ROM 111 onto a work area of the RAM 112, and controls the respective operation blocks. The operation shown in FIG. 2 is started when the user turns on a power switch of the projector 100 by the operation member 113 or remote controller. When the user turns on the power switch of the projector 100 by the operation member 113 or remote controller, the CPU 110 begins to supply electric power from a power supply unit (not shown) to the respective units via a power supply control unit (not shown).

Next, the CPU 110 determines a display mode selected by the user by operating the operation member 113 or remote controller (step S210). One of display modes of the projector 100 of this embodiment is an "input image display mode" for displaying an image or video input from the image input unit 130. One of display modes of the projector 100 of this embodiment is a "file reproduction/display mode" for displaying still image data or moving image data read out from the recording medium 192 by the recording/reproduction unit 191. One of display modes of the projector 100 of this embodiment is a "file reception/display mode" for displaying still image data or moving image data received from the communication unit 193. Note that this embodiment will explain a case in which the user selects the display mode. However, the display mode at the power-ON timing may be either that at the previous end timing or one of the display modes selected as a default display mode. In this case, the process of step S210 may be omitted.

The following description will be given under the assumption that the user selects the "input image display mode" in step S210.

If the "input image display mode" is selected, the CPU 110 waits until an image or video is input from the image input unit 130 (step S220). If the image or video is input (YES in step S220), the process advances to projection processing (step S230).

In step S230, the CPU 110 transmits the image or video input from the image input unit 130 to the image processing unit 140, and instructs the image processing unit 140 to deform the number of pixels, frame rate, and shape of the image or video and then to transmit the processed image for one frame to the liquid-crystal control unit 150. Then, the CPU 110 instructs the liquid-crystal control unit 150 to control the transmittances of the liquid-crystal elements 151R, 151G, and 151B of the liquid-crystal panels to match those according to tone levels of red (R), green (G), and blue (B) color components of the received image for one frame. Then, the CPU 110 instructs the light source control unit 160 to control light to be output from the light source 161. The color separating unit 162 separates the light output from the light source 161 into red (R), green (G), and blue (B) light components, and supplies the respective light components to the liquid-crystal elements 151R, 151G, and 151B of the liquid-crystal panels. Transmission light amounts of the light components of the respective colors supplied to the liquid-crystal elements 151R, 151G, and 151B are limited for respective pixels of the liquid-crystal elements. The red (R), green (G), and blue (B) light components transmitted through the liquid-crystal elements 151R, 151G, and 151B are supplied to the color composing unit 163 and are composed again. Then, the light composed by the color composing unit 163 is projected onto the screen 180 via the projection optical system 171.

This projection processing is sequentially executed for each image of one frame during projection of the image.

Note that when the user inputs an operation instruction of the projection optical system 171 from the operation member 113 at that time, the CPU 110 instructs the optical system control unit 170 to control the actuator of the projection optical system 171 so as to change a focal point of the projected image and to change an enlargement ratio of the optical system.

The CPU 110 determines whether or not the user inputs a display mode switching instruction from the operation member 113 during execution of this display processing (step S240). If the user inputs the display mode switching instruction from the operation member 113 (YES in step S240), the CPU 110 returns to step S210, and determines the display mode again. At this time, the CPU 110 transmits a menu screen which prompts the user to select the display mode as an OSD (On Screen Display) image to the image processing unit 140, and controls the image processing unit 140 to superimpose this OSD screen on the projected image. The user selects the display mode while observing the projected OSD screen.

On the other hand, if the user does not input any display mode switching instruction from the operation member 113 during execution of the display processing (NO in step S240), the CPU 110 determines whether or not the user inputs a projection end instruction from the operation member 113 (step S250). If the user inputs the projection end instruction from the operation member 113 (YES in step S250), the CPU 110 stops power supply to the respective operation blocks of the projector 100, thus ending the projection processing. On the other hand, if the user does not input any projection end instruction from the operation member 113 (NO in step S250), the CPU 110 returns to step S220. After that, the CPU 110 repeats the processes of steps S220 to S250 until the user inputs the projection end instruction from the operation member 113.

As described above, the projector 100 of this embodiment projects an image onto the screen.

Note that in the "file reproduction/display mode", the CPU 110 reads out a file list or thumbnail data of respective files of still image data and moving image data from the recording medium 192 from the recording/reproduction unit 191, and temporarily stores them in the RAM 112. Then, the CPU 110 generates text images based on the file list or images based on the thumbnail data of respective files, which are temporarily stored in the RAM 112 using a program stored in the ROM 111, and transmits the generated images to the image processing unit 140. After that, the CPU 110 controls the image processing unit 140, liquid-crystal control unit 150, and light source control unit 160 in the same manner as in the normal projection processing (step S230).

Next, the user inputs, via the operation member 113, a text or image selection instruction corresponding to each of still image data or moving image data recorded in the recording medium 192 on the projected screen. Then, the CPU 110 controls the recording/reproduction unit 191 to read out the selected still image data or moving image data from the recording medium 192. The CPU 110 temporarily stores the readout still image data or moving image data in the RAM 112, and reproduces the still image data or moving image data based on a program stored in the ROM 111.

Then, the CPU 110 sequentially transmits, for example, the reproduced moving image data to the image processing unit, and controls the image processing unit 140, liquid-crystal control unit 150, and light source control unit 160 in the same manner as in the normal projection processing (step S230). On the other hand, when the still image data is reproduced, the CPU 110 transmits the reproduced image to the image processing unit 140, and controls the image processing unit 140, liquid-crystal control unit 150, and light source control unit 160 in the same manner as in the normal projection processing (step S230).

In the "file reception/display mode", the CPU 110 temporarily stores still image data or moving image data received by the communication unit 193 in the RAM 112, and reproduces the still image data or moving image data based on a program stored in the ROM 111. Then, the CPU 110 sequentially transmits, for example, the reproduced moving image data to the image processing unit 140, and controls the image processing unit 140, liquid-crystal control unit 150, and light source control unit 160 in the same manner as in the normal projection processing (step S230). On the other hand, when the still image data is reproduced, the CPU 110 transmits the reproduced image to the image processing unit 140, and controls the image processing unit 140, liquid-crystal control unit 150, and light source control unit 160 in the same manner as in the normal projection processing (step S230).

<Configuration of Image Processing Unit>

The configuration of the image processing unit of this embodiment will be described below with reference to FIG. 3.

Figure 3:
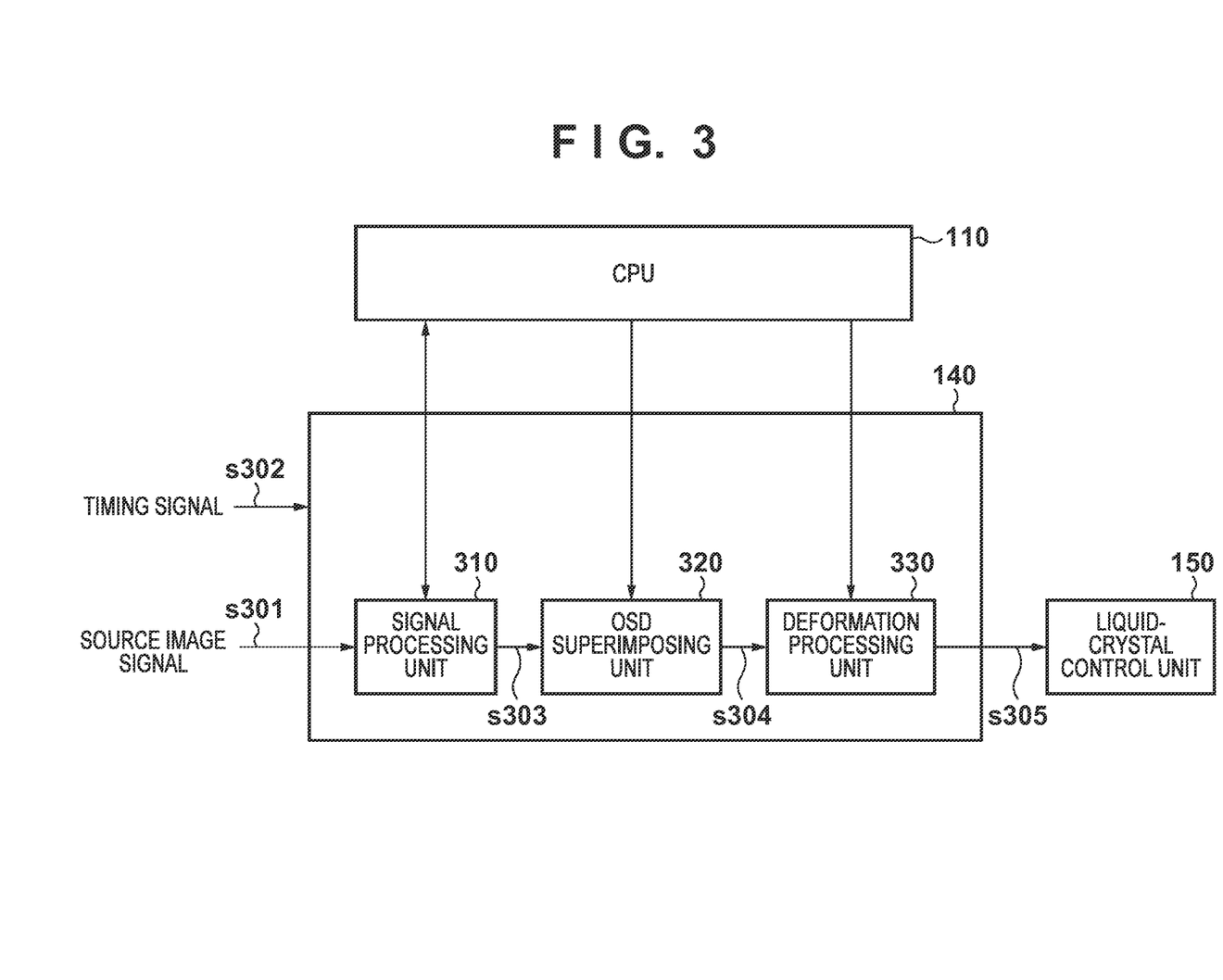
FIG. 3 is a block diagram showing an internal configuration of an image processing unit according to the first embodiment.

Referring to FIG. 3, the image processing unit 140 includes a signal processing unit 310, OSD superimposing unit 320, and deformation processing unit 330.

A source image signal s301 is input from the image input unit 130, recording/reproduction unit 191, or communication unit 193 according to the display mode, as described above. On the other hand, a timing signal s302 includes a vertical sync signal, horizontal sync signal, clocks, and the like synchronized with the source image signal s301, and is supplied from a supply source of the source image signal s301. The respective blocks in the image processing unit 140 operate based on the timing signal s302. However, a timing signal may be re-generated and used inside the image processing unit 140.

The signal processing unit 310 acquires a histogram and statistical information such as APL of an image signal from the source image signal s301, and applies signal processing such as IP conversion, frame rate conversion, resolution conversion, $\gamma$ conversion, color gamut conversion, color correction, and edge emphasis in cooperation with the CPU 110. A processed image signal s303 processed by the signal processing unit 310 is output to the OSD superimposing unit 320.

In accordance with an instruction from the CPU 110, the OSD superimposing unit 320 superimposes user menu or operation guide information on the processed image signal s303 as an OSD image, and outputs a generated OSD-superimposed signal s304 to the deformation processing unit 330.

The deformation processing unit 330 calculates coordinates of pixels before and after deformation based on a predetermined deformation formula, applies deformation processing to the OSD-superimposed signal s304, and outputs a deformed image signal s305.

Assume that the deformation processing unit 330 of this embodiment deforms an image using projective conversion. This deformation processing will be described below with reference to FIG. 8.

Figure 8:
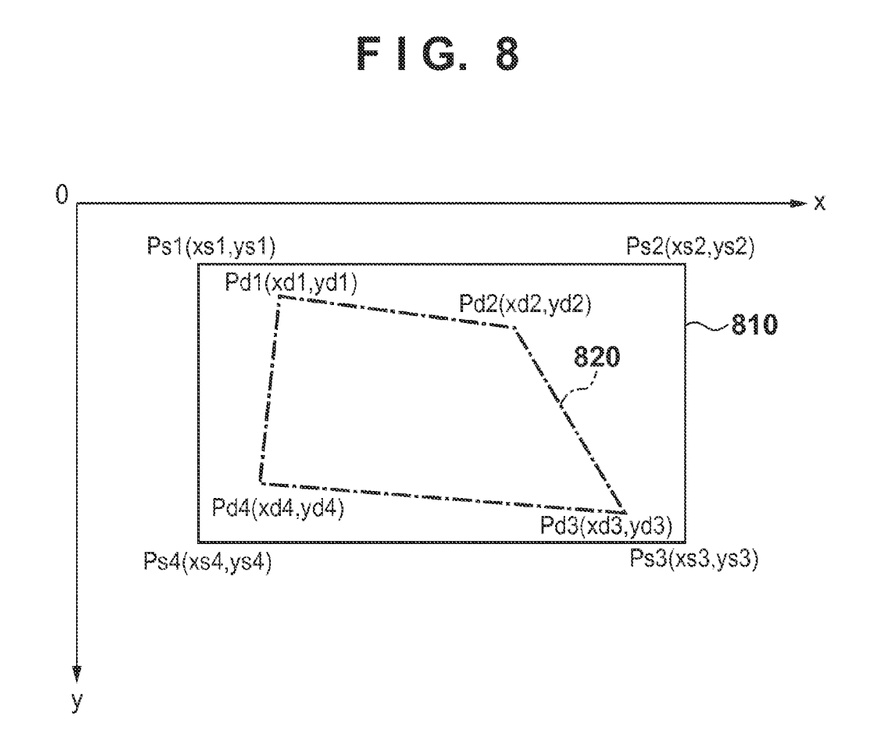
FIG. 8 is a view for explaining projective conversion.

Referring to FIG. 8, reference numeral 810 denotes an image before distortion correction (source image) having four points Ps1 to Ps4 as vertices; and 820, an image after distortion correction having four points Pd1 to Pd4 as vertices.

Note that in the projective conversion, a relationship between coordinates (xs, ys) of the source image 810 and coordinates (xd, yd) of the deformed image 820 is expressed by:

$$\begin{bmatrix} xs \\ ys \\ 1 \end{bmatrix} = M \begin{bmatrix} xd - xd1 \\ yd - yd1 \\ 1 \end{bmatrix} + \begin{bmatrix} xs1 \\ ys1 \\ 0 \end{bmatrix} \quad (1)$$

where M is a 3×3 projective conversion matrix from the deformed image to the source image, and is input from the CPU 110 to the deformation processing unit 330. xs1 and ys1 are coordinates of one vertex Ps1 of the source image 810, and xd1 and yd1 are coordinate values of the vertex Pd1 of the deformed image 820.

If the coordinates (xs, ys) of the source image, which are calculated by equation (1), assume integers, a pixel value at the coordinates may be used as that at the coordinates (xd, yd) of the deformed image intact. However, the coordinates of the source image calculated by equation (1) do not always assume integers. In this case, by executing interpolation using pixel values of surrounding pixels of the coordinates of the source image, a pixel value at deformed coordinates (xd, yd) is calculated. As the interpolation method, an arbitrary interpolation method such as bilinear, bicubic, and the like may be used. On the other hand, when the coordinates of the source image calculated based on equation (1) fall outside the range of the source image 810, black or a background color set by the user is set as a pixel value at the coordinates.

The deformation processing unit 330 calculates pixel values for all deformed coordinates in the aforementioned sequence, thereby generating a deformed image.

Note that in the above example, the projective conversion matrix M is input from the CPU 110 to the deformation processing unit 330. Alternatively, the projective conversion matrix M may be calculated inside the image processing unit 140. Note that the projective conversion matrix M is uniquely calculated from points of four corners of the source image and those of four corners of coordinates of the deformed image. This method is known, and a description thereof will not be given.

The deformed image signal s305 output from the deformation processing unit 330 is supplied to the liquid-crystal control unit 150, and is displayed on the liquid-crystal panels, as described above.

<Distortion Correction Processing & Zoom Operation>

The distortion correction processing by the projector 100 of this embodiment will be described below with reference to FIGS. 4 to 6F.

Figure 5A:
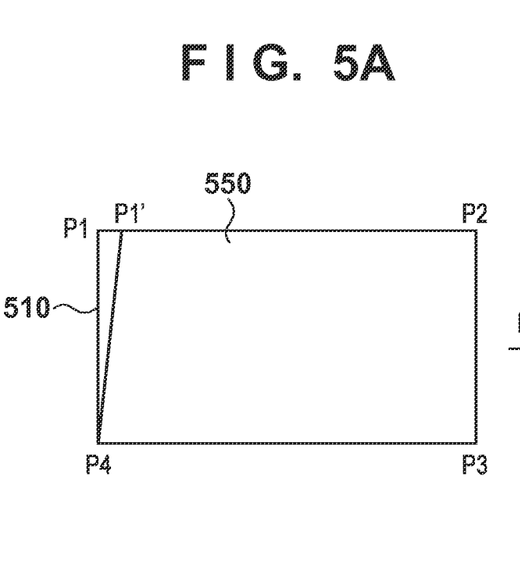
FIGS. 5A and 5B are views for explaining deformation processing by comparing a projected region on a liquid-crystal panel and that projected on a screen according to the first embodiment.
Figure 5B:
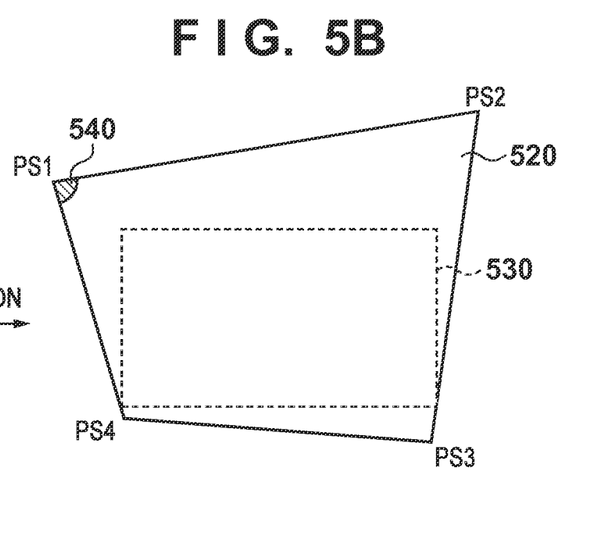

FIGS. 5A and 5B show a projected region on the liquid-crystal panel, and that projected onto a projection plane in contrast to each other. FIG. 5A shows a projected image on the liquid-crystal panel, and FIG. 5B shows that on the screen. FIG. 5A illustrates one representative liquid-crystal panel.

When the entire surface of the liquid-crystal panel is projected as a projected region 510 onto the screen, and when the projector 100 and the screen do not relatively face to each other, the projected image on the screen is a distorted rectangle 520, although the shape varies depending on a tilt angle and optical conditions. Reference numerals P1 to P4 denote points of four corners of the projected region on the liquid-crystal panel, that is, points to be moved as correction points. Reference numerals PS1 to PS4 denote points of four corners of the projected image corresponding to the correction points P1 to P4.

Figure 4:
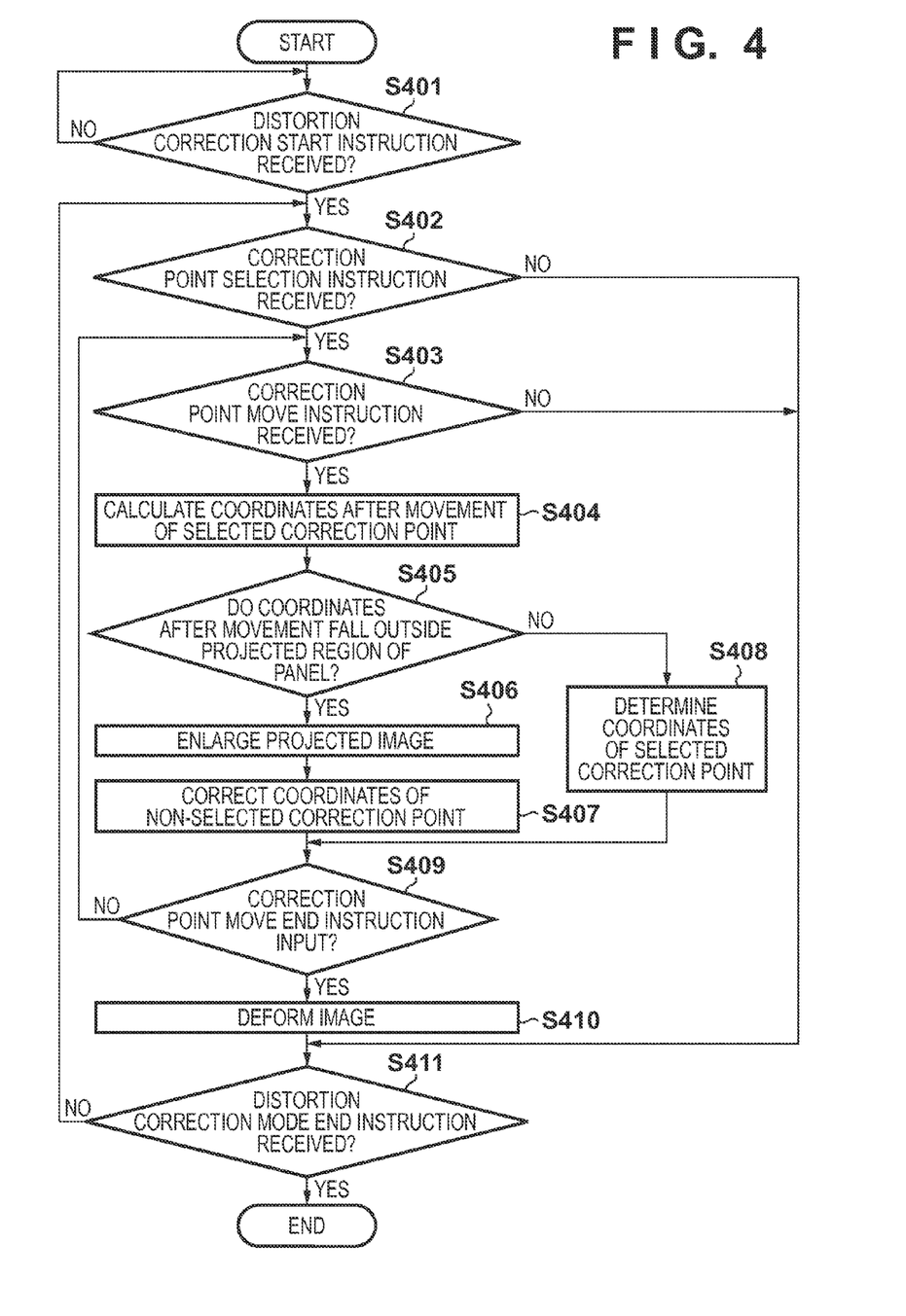
FIG. 4 is a flowchart showing deformation processing according to the first embodiment.

FIG. 4 shows the distortion correction processing by the projector 100 of this embodiment. The processing shown in FIG. 4 is implemented when the CPU 110 expands a program stored in the ROM 111 onto a work area of the RAM 112 and controls the respective operation blocks.

Referring to FIG. 4, the CPU 110 determines whether or not a start instruction of processing for executing distortion correction by moving correction points of the four corners in an image (4-corner designated distortion correction) is received from the user via the operation member 113 or remote controller (step S401). If the CPU 110 determines that the 4-corner designated distortion correction start instruction is received from the user, the process advances to step S402.

Next, the CPU 110 determines whether or not a selection instruction of a point to be moved of the correction points of the four corners is received from the user via the operation member 113 or remote controller (step S402). If the CPU 110 determines that the selection instruction of the point to be moved is received, the process advances to step S403. At this time, in order to present the correction point selected as the point to be moved in an easily understood manner, the CPU 110 may control the OSD superimposing unit 320 to superimpose an OSD in the vicinity of that correction point. The display contents are not particularly limited as long as that information allows the user to specify the selected correction point. For example, a color in the vicinity of PS1 may be changed to an eye-catching color or that point may be flickered.

On the other hand, if the CPU 110 determines in step S402 that the instruction is not received, the process jumps to step S411.

In step S403, the CPU 110 waits for a user's correction point move instruction. The correction point move instruction is a signal generated when the user presses, for example, a direction key (up, down, left, or right) of the operation member 113 or remote controller. If the CPU 110 determines that the correction point move instruction is received, the process advances to step S404. On the other hand, if the CPU 110 determines that the instruction is not received, the process jumps to step S411.

If the CPU 110 determines that the user has pressed the direction key, it calculates coordinates of the moved correction point on the liquid-crystal panel according to the pressed direction key (step S404). For example, when coordinates of the selected correction point P4 before movement are (x4, y4), and when the user has pressed the right key, coordinates after movement are (x4+m, y4) where m is a predetermined move amount.

Next, the CPU 110 determines whether or not the coordinates of the moved correction point calculated in step S404 fall within a projected region of the liquid-crystal panel (step S405). Letting (xp, yp) be resolutions of the liquid-crystal panel, if x4+m<0 or xp≤x4+m, it is determined that the coordinates fall outside the projected region of the liquid-crystal panel (outside a projected range); if 0≤x4+m<xp, it is determined that the coordinates fall within the projected region of the liquid-crystal panel (inside the projected range).

If the CPU 110 determines in step S405 that the coordinates of the moved correction point fall within the projected region of the liquid-crystal panel, the process advances to step S408. On the other hand, if the CPU 110 determines that the coordinates fall outside the projected region of the liquid-crystal panel, the process advances to step S406.

In step S406, the CPU 110 instructs the optical system control unit 170 to drive the zoom lens to optically enlarge the projected image. The optical system control unit 170 drives the zoom lens according to the instruction of the CPU 110 (step S406).

At this time, before the optical system control unit 170 drives the zoom lens, the CPU 110 may instruct the OSD superimposing unit 320 to superimpose an OSD message representing that enlargement processing of the projected image is to be executed. Alternatively, after the CPU 110 receives a signal representing a zoom operation OK message from the user via the operation member 113 or remote controller, it may instruct the optical system control unit 170 to drive the zoom lens.

Alternatively, the CPU 110 may not issue a zoom lens driving instruction if it receives a move instruction once, but it may issue a zoom lens driving instruction when it receives a continuous move instruction during a predetermined period (for example, when the user keeps pressing a key of the operation member 113 or remote controller).

Next, the CPU 110 executes correction processing for moving coordinates of the respective correction points of the four corners to the inside of the projected image (step S407). For example, letting (xc, yc) be coordinates of a zoom central point on the liquid crystal panel under optical conditions at a certain timing, X and Y coordinates of a certain correction point after correction are set as follows with respect to coordinates (xn, yn) of that correction point on the liquid crystal panel.

X coordinate:

$xn+xm$ (when $xn<xc$)

$xn-xm$ (when $xn \geq xc$)

Y coordinate:

$yn+ym$ (when $yn<yc$)

$yn-ym$ (when $yn \geq yc$)

where (xm, ym) are predetermined correction amounts, which may be determined for each correction point according to a distance from a vertex before correction or may be changed in proportion to a driving amount of the zoom lens. This correction processing may be applied to all the four correction points, but may be applied to three correction points except for the currently selected correction point or that designated first. Alternatively, the correction processing may be applied to only a correction point, coordinates of which have already been determined in step S409 (to be described later).

Also, in order to present the correction point, the coordinates of which are corrected, to the user in an easily understood manner, the CPU 110 may instruct the OSD superimposing unit 320 to superimpose an OSD in the vicinity of the correction point. The display contents are not particularly limited as long as that information allows the user to specify the correction point, the coordinates of which are corrected. For example, a color in the vicinity of the correction point, the coordinates of which are corrected, may be changed to an eye-catching color or that point may be flickered.

In step S408, the CPU 110 determines the coordinates of the selected correction point P4 on the liquid-crystal panel to be the coordinates after movement calculated in step S403, and the process advances to step S409. At this time, the CPU 110 instructs the OSD superimposing unit 320 to superimpose lines coupling the correction points P1 to P4 on the projected image. In this manner, the user can easily recognize the shape after correction.

The CPU 110 determines in step S409 whether or not a move end instruction of the selected correction point is received from the user via the operation member 113 or remote controller (step S409). This determination process can be attained by checking if a predetermined key such as an enter key or cancel key of the operation member 113 or remote controller is pressed. If the CPU 110 determines that the move end instruction of the selected correction point is received, the process advances to step S410. On the other hand, if the CPU 110 determines that the instruction is not received, the process returns to step S403.

In step S410, the CPU 110 instructs the deformation processing unit 330 to deform an input image according to the coordinates of the correction points at the time of step S409 (step S410). At this time, the CPU 110 calculates a projective conversion matrix M required to project coordinates of the deformed image on the liquid-crystal panel onto those of the source image on the liquid-crystal panel, and transmits that matrix to the deformation processing unit 330. The deformation processing unit 330 deforms the input image according to the information received from the CPU 110.

The CPU 110 determines in step S411 whether or not a 4-corner designated distortion correction end instruction is received from the user via the operation member 113 or remote controller (step S411). If the CPU 110 determines that the distortion correction end instruction is received, this processing ends. On the other hand, if the CPU 110 determines that the instruction is not received, the process returns to step S402.

<Change State of Projected Image During Distortion Correction Processing>

Change states of the projected image during the distortion correction processing will be described below with reference to FIGS. 6A to 6F by associating user operations with changes of the projected image on the projection plane.

Figure 6A:
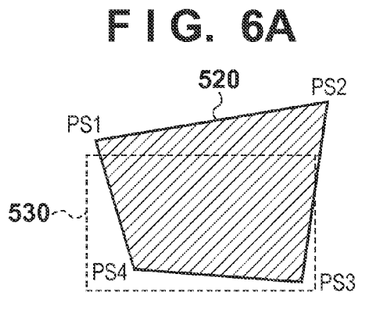
FIGS. 6A to 6F are views for explaining deformation processing according to the first embodiment.

A case will be exemplified below wherein a projected image 520 does not include an entire target shape 530, as shown in FIG. 6A, before the beginning of distortion correction processing.

Assume that the user selects the correction point P4 in step S402. Then, assume that the user presses the left key of the remote controller in step S403. At this time, the CPU 110 determines in steps S404 and S405 that coordinates after movement of the correction point P4 fall outside the projected region of the liquid-crystal panel. For this reason, the projected image 520 is enlarged by the optical system control unit 170 in step S406.

Figure 6B:
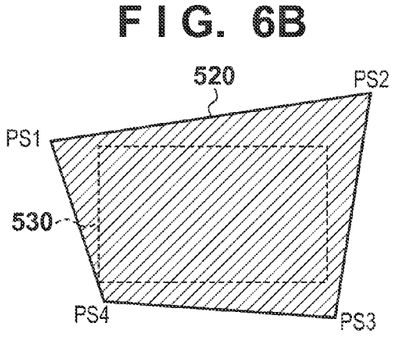

The user presses the left key a predetermined number of times to set the projected image 520 in a state in which it includes the target shape 530, as shown in FIG. 6B. At this time, the processes of steps S403 to S409 are repeated inside the projector 100.

Next, assume that the user presses the up key of the remote controller. At this time, the CPU 110 determines in steps S404 and S405 that the coordinates after movement of the correction point P4 fall within the projected region of the liquid-crystal panel. Thus, the CPU 110 updates the coordinates of the correction point P4 in step S408.

When a point P4 on the screen of the correction point P4 matches the vertex of the target shape, the user presses the enter key of the remote controller to input a move end instruction.

Figure 6C:
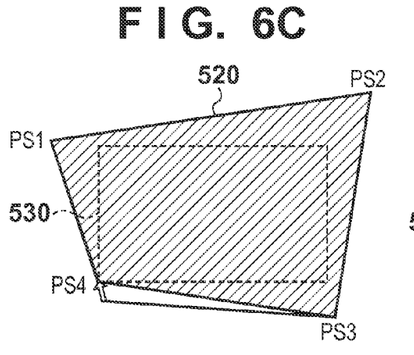

After that, the process advances to step S410, and the projected image is deformed, as shown in FIG. 6C.

Figure 6D:
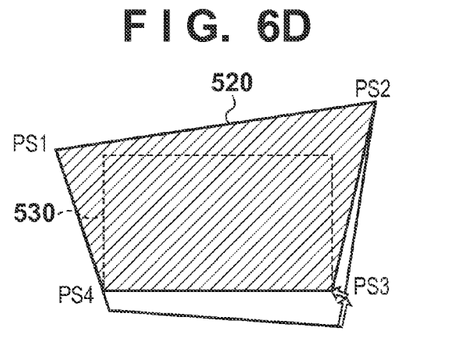
Figure 6E:
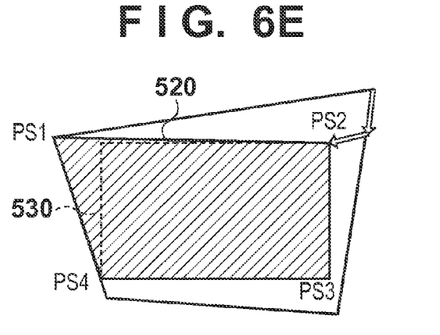
Figure 6F:
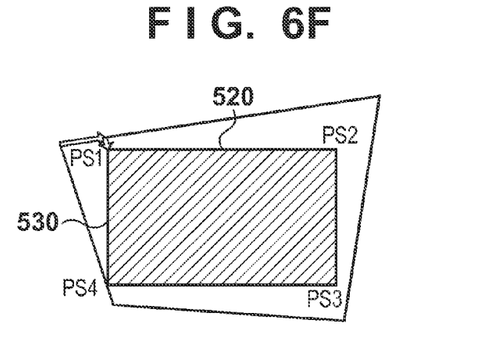

Next, the user selects the correction points P3, P2, and P1 in turn by the same sequence, and inputs move instructions so that the correction points match the vertices of the target shape. Changes of the projected image in this case are, as shown in FIGS. 6D to 6F.

With the aforementioned sequence, the distortion correction can be executed so that the projected image matches the target shape. As described above, according to the projector of this embodiment, when the user attempts to move the correction point to the outside of the projected image at the distortion correction timing, the zoom lens is driven to enlarge the projected image on the screen. With this operation, the projector of this embodiment can project a distortion-corrected image at an arbitrary position on the projection plane irrespective of the projection state before the distortion correction.

Note that this embodiment has explained the sequence in which after the coordinates of the correction point are determined in step S409, the process advances to step S410 to deform an image. However, every time the coordinates of the correction point are updated in step S407 or S408, the image may be deformed.

Figure 9:
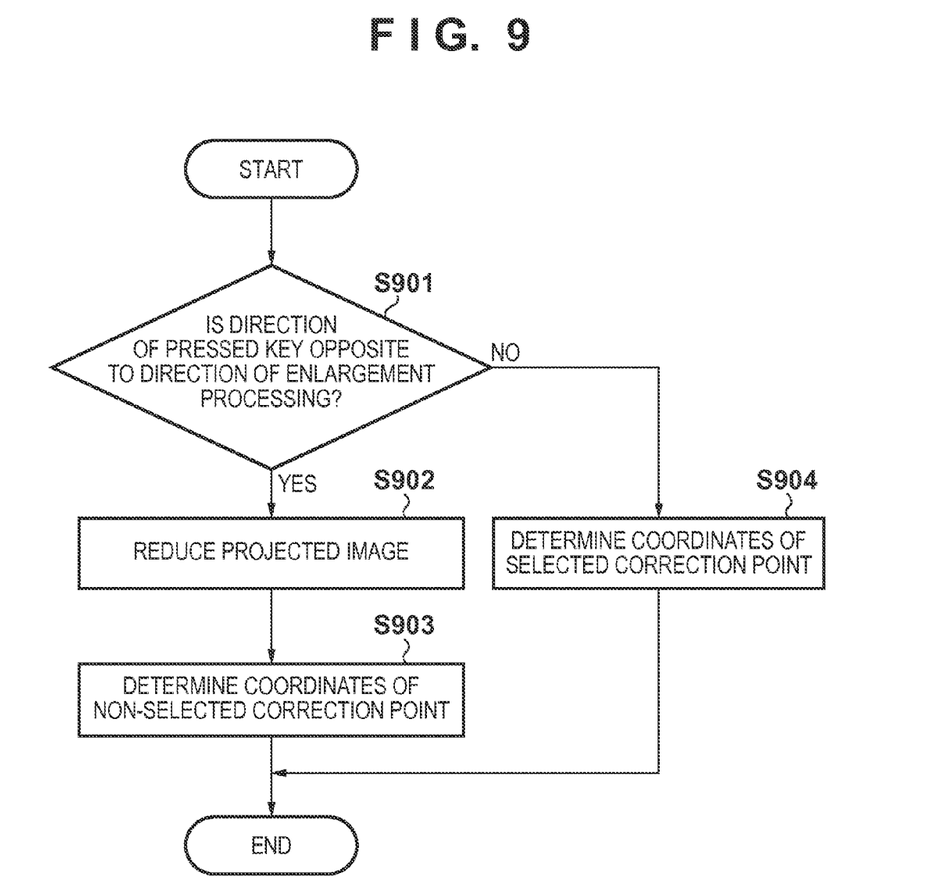
FIG. 9 is a flowchart showing a modification of step S406 in FIG. 4.

Note that as another operation example of step S408, when steps S406 and S407 are executed once or more during movement of a certain correction point (during a loop of steps S403 to S409), the respective blocks of the projector 100 may operate, as shown in FIG. 9.

The CPU 110 determines whether or not the pressed direction key is that of a direction opposite to the direction key pressed upon execution of the enlargement processing using the zoom lens in step S406 (step S901). If the CPU 110 determines the opposite direction, the process advances to step S902. On the other hand, if the CPU 110 determines the same direction, the process advances to step S904.

In step S902, the CPU 110 instructs the optical system control unit 170 to drive the zoom lens to reduce the projected image. The optical system control unit 170 drives the zoom lens according to the instruction of the CPU 110 (step S902).

Next, the CPU 110 executes correction processing of the coordinates of the correction points of the four corners (step S903). Letting (xc, yc) be coordinates of a zoom central point, X and Y coordinates of a certain correction point after correction are respectively set as follows with respect to coordinates (xn, yn) before correction.

X coordinate:

$xn+xm$ (when $xn<xc$)

$xn-xm$ (when $xn \geq xc$)

Y coordinate:

$yn+ym$ (when $yn<yc$)

$yn-ym$ (when $yn \geq yc$)

where (xm, ym) are predetermined correction amounts, which are desirably amounts used in step S407 executed when the direction key opposite to the currently pressed direction key is pressed.

In step S904, the CPU 110 determines the coordinates of the selected correction point P4 on the liquid-crystal panel to be those after movement, which are calculated in step S403.

The other operation example of step S408 has been described. For example, when the user makes a wrong key operation to unnecessarily enlarge the projected image, a zoom state can be reverted. For this reason, compared to a case in which the zoom state is not reverted, unnecessary resolution deterioration caused by distortion correction can be suppressed.

On the other hand, if the CPU 110 determines in step S406 that the zoom state reaches a wide-angle end, and enlarged projection cannot be executed any more, it may instruct the OSD superimposing unit 320 to superimpose a warning OSD, and the process may return to step S403. Alternatively, the CPU 110 may instruct the optical system control unit 170 to drive a shift lens in accordance with the received direction of the direction key so as to shift the projected image.

[Second Embodiment]

A projector of this embodiment is configured to also interlock a shift lens. Note that the overall configuration and basic operation of the projector, and the configuration of an image processing unit are the same as those of the first embodiment, and a description thereof will not be repeated.

Figure 7:
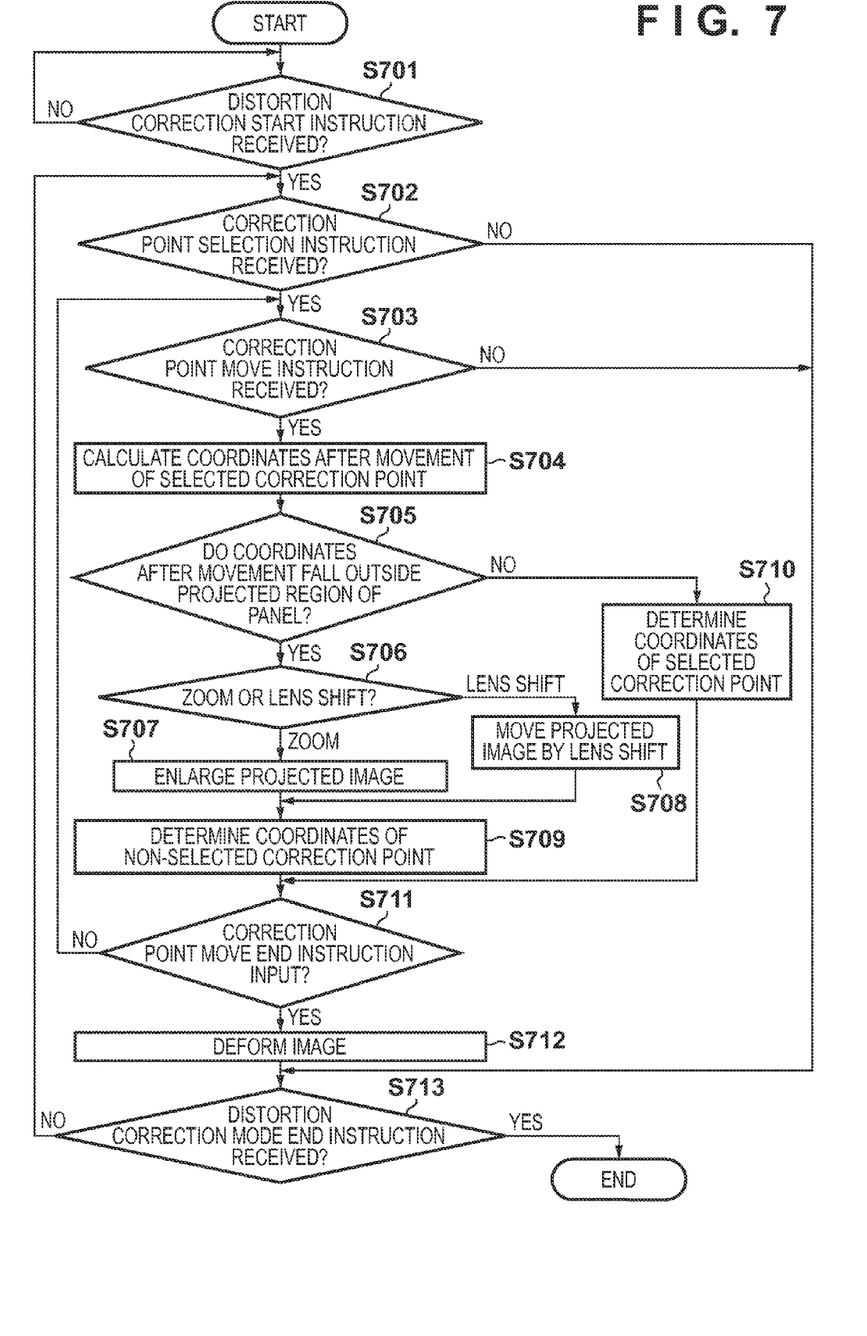
FIG. 7 is a flowchart showing deformation processing according to the second embodiment.

FIG. 7 shows the operation of a projector 100 of this embodiment. The operation shown in FIG. 7 is implemented when a CPU 110 expands a program stored in a ROM 111 onto a work area of a RAM 112 and controls respective operation blocks. Since processes of steps S701 to S705 in FIG. 7 are the same as those of steps S401 to S405 in FIG. 4, a description thereof will not be repeated.

Referring to FIG. 7, if the CPU 110 determines in step S705 that coordinates after movement of a correction point fall outside a projected region, the process advances to step S706.

The CPU 110 determines in step S706 whether it instructs an optical system control unit 170 to drive a zoom lens to attain a zoom operation or to drive a shift lens to attain a lens shift operation.

In this determination process, for example, when any or all of coordinates of remaining three correction points have already been determined, the zoom operation is to be executed; otherwise, the lens shift operation is to be executed. The determination method is not limited to this. For example, when the zoom lens cannot be driven to an enlargement side any more, it may be determined that the lens shift operation is to be executed. If the CPU 110 determines that the zoom operation is to be executed, the process advances to step S707; otherwise, the process advances to step S708.

In step S707, the CPU 110 instructs the optical system control unit 170 to drive the zoom lens so as to optically enlarge the projected image. The optical system control unit 170 drives the zoom lens according to the instruction of the CPU 110 (step S707).

In step S708, the CPU 110 instructs the optical system control unit 170 to drive the shift lens so as to move the projected image on the screen. The optical system control unit 170 drives the shift lens according to the instruction of the CPU 110 (step S708). The shift direction in this case matches the moving direction of the correction point determined in step S703.

In step S709, the CPU 110 executes correction processing of coordinates of correction points of four corners (step S709). For example, using predetermined correction amounts (xk, yk), corrected coordinates are calculated as (xn−xk, yn−yk) with respect to coordinates (xn, yn) of a certain correction point before correction.

This correction processing may be executed for three correction points except for the currently selected correction point or for only correction points, coordinates of which have already been determined. Note that the correction amounts may assume different values for respective correction points, or may be changed according to the driving amount of the zoom lens or shift lens.

In order to present the correction point, coordinates of which are corrected, to the user in an easily understood manner, the CPU 110 may instruct an OSD superimposing unit 320 to superimpose an OSD in the vicinity of the correction point. The display contents are not particularly limited as long as the information allows the user to specify the correction point, coordinates of which are corrected. For example, a color in the vicinity of the correction point, coordinates of which are corrected, may be changed to an eye-catching color or that point may be flickered.

Processes of subsequent steps S710 to S713 are the same as those of steps S408 to S411 in FIG. 4, and a description thereof will not be repeated.

<Change State of Projected Image During Distortion Correction Processing>

Figure 10A:
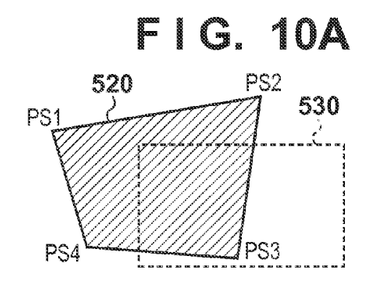
FIGS. 10A to 10G are views for explaining deformation processing according to the second embodiment.

Change states of the projected image during the distortion correction processing will be described below with reference to FIGS. 10A to 10G by associating user operations with changes of the projected image on a projection plane. A case will be exemplified below wherein a projected image 520 does not include an entire target shape 530, as shown in FIG. 10A, before the beginning of distortion correction processing.

Assume that the user selects the correction point P2 in step S702. Then, assume that the user presses the left key of the remote controller in step S703. At this time, the CPU 110 determines in steps S704 and S705 that coordinates after movement of the correction point P2 fall outside a projected region of a liquid-crystal panel. In this case, since coordinates of correction points P1, P3, and P4 other than the point P2 are not changed yet, the CPU 110 determines that the lens shift operation is to be executed.

Figure 10B:
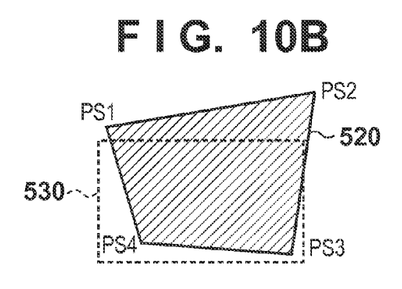
Figure 10C:
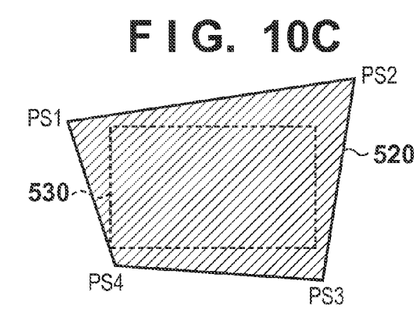
Figure 10D:
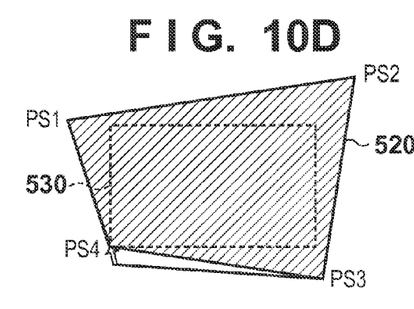
Figure 10E:
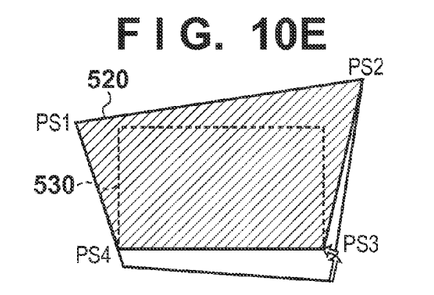
Figure 10F:
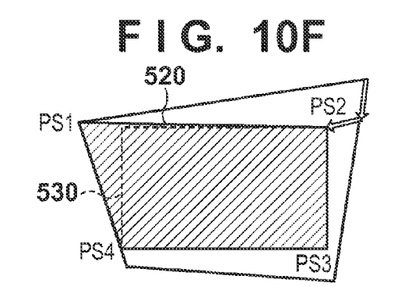
Figure 10G:
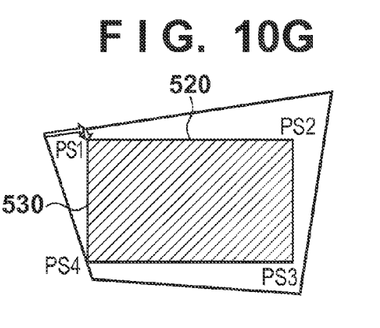

The user presses a right key a predetermined number of times to move the projected image 520 to the right, as shown in FIG. 10B. At this time, the processes of steps S703 to S711 are repeated inside the projector 100. The user presses an enter button of a remote controller, thus ending movement of the projected image.

Since subsequent FIGS. 10C to 10G are the same as FIGS. 6B to 6F, a description thereof will not be repeated.

With the aforementioned sequence, distortion correction can be executed, so that the projected image matches the target shape.

Other Embodiments

Embodiments of the present invention can also be realized by a computer of a system or apparatus that reads out and executes computer executable instructions recorded on a storage medium (for example, non-transitory computer-readable storage medium) to perform the functions of one or more of the above-described embodiment(s) of the present invention, and by a method performed by the computer of the system or apparatus by, for example, reading out and executing the computer executable instructions from the storage medium to perform the functions of one or more of the above-described embodiment(s). The computer may comprise one or more of a central processing unit (CPU), micro processing unit (MPU), or other circuitry, and may include a network of separate computers or separate computer processors. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2012-179886, filed Aug. 14, 2012 which is hereby incorporated by reference herein in its entirety.

What is claimed is:

1. An image projection apparatus comprising:
a projection unit configured to project an image onto a projection plane through a zoom lens;
an instruction receiving unit configured to receive an instruction for moving a correction point for correcting a projected range of the image;
a deformation unit configured to deform the projected range of the image according to a moved position of the correction point; and
a control unit configured to, if the correction point is moved to an outside of a predetermined range, optically change the projected range of the image projected by the projection unit by driving the zoom lens in accordance with a movement of the correction point.

2. The image projection apparatus according to claim 1, wherein the control unit enlarges the projected range of the image projected by the projection unit according to the movement of the correction point to the outside of the predetermined range.

3. The image projection apparatus according to claim 2, wherein the control unit enlarges the projected range of the image projected by the projection unit by driving the zoom lens in an enlarging direction according to the movement of the correction point to the outside of the predetermined range.

4. The image projection apparatus according to claim 1, wherein the control unit moves the projected range of the image projected by the projection unit according to the movement of the correction point to the outside of the predetermined range.

5. The image projection apparatus according to claim 4, wherein the control unit moves the projected range of the image projected by the projection unit by moving a position of a lens included in the projection unit in a plane perpendicular to an optical axis of the lens according to the movement of the correction point to the outside of the predetermined range.

6. The image projection apparatus according to claim 1, wherein the control unit enlarges the projected range of the image projected by the projection unit according to the movement of the correction point to the outside of the predetermined range, and the control unit further moves a correction point different from the correction point which is moved to the outside of the predetermined range to an inside of the projected range.

7. The image projection apparatus according to claim 1, wherein the control unit executes enlargement of the projected range of the image projected by the projection unit in priority to movement of the projected range of the image projected by the projection unit.

8. The image projection apparatus according to claim 1, wherein the control unit inhibits designation of the outside of the projected range for a correction point which is not the moved correction point.

9. The image projection apparatus according to claim 1, wherein the projection unit displays an image representing the correction point on the projection plane.

10. A control method of an image projection apparatus comprising (a) a projection unit configured to project an image onto a projection plane through a zoom lens, (b) an instruction receiving unit configured to receive an instruction for moving a correction point for correcting a projected range of the image, and (c) a deformation unit configured to deform the projected range of the image according to a moved position of the correction point, the control method comprising:
optically changing, if the correction point is moved to an outside of a predetermined range, the projected range of the image projected by the projection unit by driving the zoom lens in accordance with a movement of the correction point.

11. The control method according to claim 10, wherein the projected range of the image projected by the projection unit is enlarged according to the movement of the correction point to the outside of the predetermined range.

12. The control method according to claim 11, wherein the projected range of the image projected by the projection unit is enlarged by driving the zoom lens included in an enlarging direction according to the movement of the correction point to the outside of the predetermined range.

13. The control method according to claim 10, wherein the projected range of the image projected by the projection unit is moved according to the movement of the correction point to the outside of the predetermined range.

14. The control method according to claim 13, wherein the projected range of the image projected by the projection unit is moved by moving a position of a lens included in the projection unit in a plane perpendicular to an optical axis of the lens according to the movement of the correction point to the outside of the predetermined range.

15. The control method according to claim 10, wherein the projected range of the image projected by the projection unit is enlarged according to the movement of the correction point to the outside of the predetermined range, and a correction point different from the correction point which is moved to the outside of the predetermined range is moved to an inside of the projected range.

16. The control method according to claim 10, wherein enlargement of the projected range of the image projected by the projection unit is executed in priority to movement of the projected range of the image projected by the projection unit.

17. The control method according to claim 10, wherein the outside of the projected range is inhibited from being designated for a correction point which is not the moved correction point.

18. The control method according to claim 10, wherein an image representing the correction point is displayed on the projection plane.

* * * * *